United States Patent
Yoshida et al.

(10) Patent No.: US 8,571,732 B2
(45) Date of Patent: Oct. 29, 2013

(54) VEHICLE SKID CONTROL DEVICE

(75) Inventors: Michio Yoshida, Nishikamo-gun (JP);
Kenji Umayahara, Nishikamo-gun (JP);
Tomoyuki Nishida, Nagoya (JP)

(73) Assignee: Toyota Jidosha Kabushiki Kaisha,
Toyota-Shi (JP)

( * ) Notice: Subject to any disclaimer, the term of this patent is extended or adjusted under 35 U.S.C. 154(b) by 583 days.

(21) Appl. No.: 12/810,474

(22) PCT Filed: Dec. 11, 2008

(86) PCT No.: PCT/JP2008/072557
§ 371 (c)(1),
(2), (4) Date: Jun. 24, 2010

(87) PCT Pub. No.: WO2009/084401
PCT Pub. Date: Jul. 9, 2009

(65) Prior Publication Data
US 2010/0280696 A1    Nov. 4, 2010

(30) Foreign Application Priority Data

Dec. 27, 2007 (JP) ................ 2007-337828

(51) Int. Cl.
*B60L 9/00* (2006.01)
*G05D 1/00* (2006.01)
*G06D 7/00* (2006.01)
*G06F 17/00* (2006.01)
*B60T 7/12* (2006.01)
*B60T 8/60* (2006.01)

(52) U.S. Cl.
USPC ........ 701/22; 701/1; 701/36; 701/73; 701/74; 303/148; 303/150

(58) Field of Classification Search
USPC .............. 701/1, 22, 36, 73–74; 303/148, 150
See application file for complete search history.

(56) References Cited

U.S. PATENT DOCUMENTS 6,308,115 B1 * 10/2001 Yamaguchi et al. .......... 701/1
7,377,349 B2    5/2008 Hommi et al.

FOREIGN PATENT DOCUMENTS

| CN | 1681680 A | 10/2005 |
|---|---|---|
| JP | 2004-96822 A | 3/2004 |
| JP | 2004-96823 A | 3/2004 |
| JP | 2004-96825 A | 3/2004 |
| JP | 2004-112973 A | 4/2004 |
| JP | 2004112973 A * | 4/2004 |
| JP | 2006-283591 A | 10/2006 |

OTHER PUBLICATIONS

JP-2004112973 English Translation, JPO.*

* cited by examiner

*Primary Examiner* — Helal A Algahaim
*Assistant Examiner* — Yazan A Soofi
(74) *Attorney, Agent, or Firm* — Kenyon & Kenyon LLP

(57) ABSTRACT

Provided is a vehicle skid control device that avoids a skid erroneous judgment in a high revolution range of a motor. The vehicle skid control device detects the number of revolutions of the motor. When the number of revolutions of the motor is equal to or larger than a predetermined threshold value Nm, the vehicle skid control device prohibits a skid judgment. When the number of revolutions of the motor is smaller than the predetermined threshold value Nm, the vehicle skid control device permits the skid judgment. When the number of revolutions of the motor is equal to or larger than the threshold value Nm, the skid judgment is prohibited. Accordingly, it is possible to avoid the skid erroneous judgment in the high revolution range with the number of revolutions equal to or larger than Nm.

2 Claims, 2 Drawing Sheets

VEHICLE SKID CONTROL DEVICE

This is a 371 national phase application of PCT/JP2008/072557 filed 11 Dec. 2008, which claims priority to Japanese Patent Application No. 2007-337828 filed 27 Dec. 2007, the contents of which are incorporated herein by reference.

TECHNICAL FIELD

The present invention relates to a skid control device for controlling a motor that transmits power to a drive shaft connected to drive wheels of respective wheels.

BACKGROUND ART

In general, as to vehicle running, drive wheels may go into a skid in some cases when a vehicle suddenly accelerates or when the vehicle is running on a low μ road surface. The skid of the drive wheels as described above impairs vehicle running stability, and hence development of a traction control of judging a skid of drive wheels to restrict a drive torque has been advanced. For example, Japanese Patent Laid-Open No. 2004-112973 describes a traction control of judging occurrence of a skid when an angular acceleration of a drive shaft that transmits power to drive wheels exceeds a predetermined threshold value, to restrict a drive torque. Japanese Patent Laid-Open No. 2004-112973 also describes that, even when the angular acceleration of the drive shaft exceeds the predetermined threshold value, in a case where a driving state of a vehicle is judged to be a state where the angular acceleration of the drive shaft varies independently of a skid, the restriction of the drive torque is prohibited.
Patent Document 1: Japanese Patent Laid-Open No. 2004-112973

DISCLOSURE OF THE INVENTION

Problems to be Solved by the Invention

However, in the vehicle in which the drive shaft is driven by a drive torque outputted from a motor, when a revolution speed of the motor reaches a high revolution range, a pulse width modulation (PWM) signal that controls an inverter for supplying an alternating current electric power to the motor and a pickup cycle of a resolver that detects a rotor position (angular velocity) of the motor resonate with each other, which may cause fluctuations in resolver detection signal. There is a fear that the fluctuations in resolver detection signal are erroneously judged as an indication of an increase in angular acceleration of the motor (occurrence of skid). Therefore, the fluctuations in resolver detection signal have been a factor of causing an unexpected malfunction that the drive torque is restricted even when the vehicle is running while gripping a road surface.

In view of the above, the present invention has an object to provide a vehicle skid control device that avoids a skid erroneous judgment in the high revolution range of the motor.

Means for Solving the Problems

According to the present invention, a vehicle skid control device for controlling a motor that transmits power to a drive shaft connected to drive wheels of respective wheels, includes: a number-of-revolutions detection device for detecting the number of revolutions of the motor; an angular acceleration detection device for detecting an angular acceleration of the drive shaft; a skid judgment device for judging, based on the angular acceleration detected by the angular acceleration detection device, whether or not the drive wheels are skidding; and a skid judgment execution condition judgment device for permitting, when the number of revolutions detected by the number-of-revolutions detection device is smaller than a predetermined threshold value, a skid judgment by the skid judgment device, and prohibiting, when the number of revolutions detected by the number-of-revolutions detection device is equal to or larger than the predetermined threshold value, the skid judgment by the skid judgment device.

When the number of revolutions of the motor is equal to or larger than the predetermined threshold value, the skid judgment to be executed by the skid judgment device is prohibited. Accordingly, it is possible to avoid the skid erroneous judgment in the high revolution range of the motor.

Preferably, the predetermined threshold value may correspond to the smallest number of revolutions in a revolution range of the motor in which the skid judgment device makes the skid erroneous judgment due to a detection error of the angular velocity detection device.

Advantage of the Invention

According to the present invention, it is possible to avoid the skid erroneous judgment in the high revolution range of the motor.

DESCRIPTION OF SYMBOLS

10 . . . control unit, 20 . . . battery, 30 . . . DC/DC converter, 40 . . . fuel cell stack, 50 . . . accessories, 60 . . . traction inverter, 61 . . . traction motor, 64 . . . angular velocity detection sensor, 65 . . . drive shaft, 100 . . . fuel cell system

BEST MODE FOR CARRYING OUT THE INVENTION

Hereinafter, an embodiment of the present invention is described with reference to the accompanying drawings.

Figure 1:
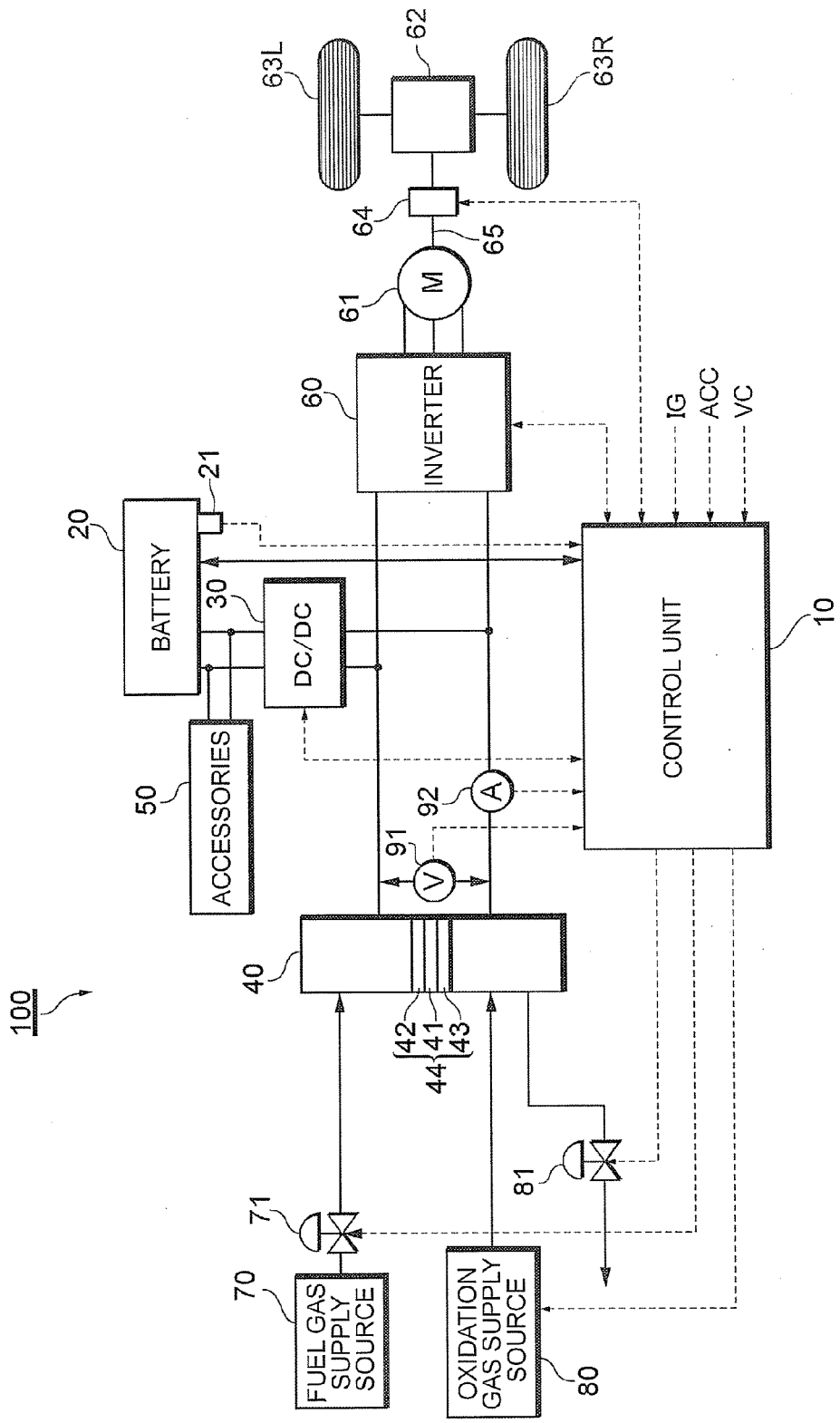
FIG. 1 is a configuration diagram illustrating a fuel cell system according to an embodiment.

FIG. 1 illustrates a system configuration of a fuel cell system 100 that functions as an on-vehicle power supply system for a fuel cell vehicle.

A fuel cell stack 40 is a polymer electrolyte cell stack formed by stacking a plurality of cells in series. The fuel cell stack 40 includes a membrane electrode assembly (MEA) 44 that is formed by, for example, screen-printing an anode 42 and a cathode 43 on respective surfaces of a polymer electrolyte membrane 41. The polymer electrolyte membrane 41 includes a proton-conducting ion-exchange membrane formed of a fluorine-contained resin or the like. Both surfaces of the membrane electrode assembly 44 are sandwiched by ribbed separators (not shown). A groove-like anode gas channel and a groove-like cathode gas channel are formed between the separators and the anode 42 and the cathode 43, respectively. In the fuel cell stack 40, the oxidation reaction represented by the following expression (1) occurs at the anode while the reduction reaction represented by the following expression (2) occurs at the cathode. The electrogenic reaction represented by the following expression (3) occurs in the fuel cell stack 40 as a whole.

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

A voltage sensor 91 for detecting an output voltage of the fuel cell stack 40 and a current sensor 92 for detecting an output current thereof are connected to the fuel cell stack 40.

A fuel gas supply source 70 includes, for example, a high-pressure hydrogen tank or a hydrogen storing alloy, and reserves a high-pressure (for example, 35 MPa to 70 MPa) hydrogen gas. A supply pressure of the hydrogen gas is adjusted by a pressure adjustment valve 71. An oxidation gas supply source 80 is, for example, an air compressor that pressurizes an air taken out of the atmosphere and supplies the pressurized air (oxidation gas). A supply pressure of the pressurized air is adjusted by a pressure adjustment valve 81.

The fuel cell system 100 is configured as a parallel hybrid system in which a DC/DC converter 30 and a traction inverter 60 are connected in parallel to the fuel cell stack 40. The DC/DC converter 30 has a function of raising a direct current voltage supplied from a battery 20 to output the raised voltage to the traction inverter 60, and a function of lowering a direct current electric power generated by the fuel cell stack 40 or a regenerative electric power collected by a traction motor 61 through regenerative breaking to charge the battery 20 therewith. Charging and discharging of the battery 20 are controlled by those functions of the DC/DC converter 30. A voltage conversion control performed by the DC/DC converter 30 controls an operation point (output voltage, output current) of the fuel cell stack 40.

The battery 20 functions as a storage source of surplus electric power, a storage source of regenerative energy during the regenerative breaking, and an energy buffer in a case of a load varied along with acceleration or deceleration of a fuel cell vehicle. For example, secondary batteries such as a nickel-cadmium storage battery, a nickel-hydrogen storage battery, and a lithium secondary battery are suitably used as the battery 20. A state of charge (SOC) sensor 21 for detecting an SOC is connected to the battery 20.

The traction inverter 60 is, for example, a PWM inverter driven by a pulse width modulation system, and converts a direct current voltage outputted from the fuel cell stack 40 or the battery 20 into a three-phase alternating current voltage according to a control command issued by a control unit 10, to control a rotary torque of the traction motor 61. The traction motor 61 is, for example, a three-phase alternating current motor, and constitutes a power source of the fuel cell vehicle. A drive shaft 65 transmits a drive torque outputted from the traction motor 61 to drive wheels 63L and 63R via a reduction gear 62. An angular velocity detection sensor 64 for detecting an angular velocity of the drive shaft 65 is connected to the drive shaft 65. A resolver (variable reluctance type angle detector) for detecting a rotor position of the traction motor 61 is suitably used as the angular velocity detection sensor 64. The angular velocity of the drive shaft 65 is in proportion to the number of revolutions of the motor.

Respective motors (for example, power sources for pumps and the like) disposed in respective sections of the fuel cell system 100, inverters for driving those motors, and further various on-vehicle accessories (for example, air compressor, injector, cooling water circulation pump, radiator, and the like) are collectively called as accessories 50.

The control unit 10 receives output signals from various sensors (for example, voltage sensor 91, current sensor 92, SOC sensor 21, angular velocity detection sensor 64, and the like) to control the respective sections of the fuel cell system 100. For example, upon receiving an activation signal IG outputted from an ignition switch, the control unit 10 starts the operation of the fuel cell system 100, and calculates an electric power required for vehicle running and an electric power consumed by the accessories based on an accelerator opening degree signal ACC outputted from an accelerator sensor and a vehicle speed signal VC outputted from a vehicle speed sensor.

Here, the electric power for the accessories includes an electric power consumed by the on-vehicle accessories (humidifier, air compressor, hydrogen pump, cooling water circulation pump, and the like), an electric power consumed by devices required for the vehicle running (transmission, wheel controller, steering gear, suspension, and the like), and an electric power consumed by devices installed in a passenger's space (air conditioner, lighting equipment, audio system, and the like).

Further, the control unit 10 determines a proportion of the output electric powers between the fuel cell stack 40 and the battery 20, and then controls reaction gas supplies from the fuel gas supply source 70 and the oxidation gas supply source 80 such that an amount of the electric power generated by the fuel cell stack 40 matches a target electric power while also controlling the DC/DC converter 30, to thereby adjust the output voltage of the fuel cell stack 40. In this manner, the control unit 10 controls the operation point (output voltage, output current) of the fuel cell stack 40. Moreover, in order to obtain a target torque corresponding to the accelerator opening degree, the control unit 10 outputs, as a switching command, for example, command values of respective u-phase, v-phase, and w-phase alternating current voltages to the traction inverter 60, to thereby control an output torque and the number of revolutions of the traction motor 61.

Figure 2:
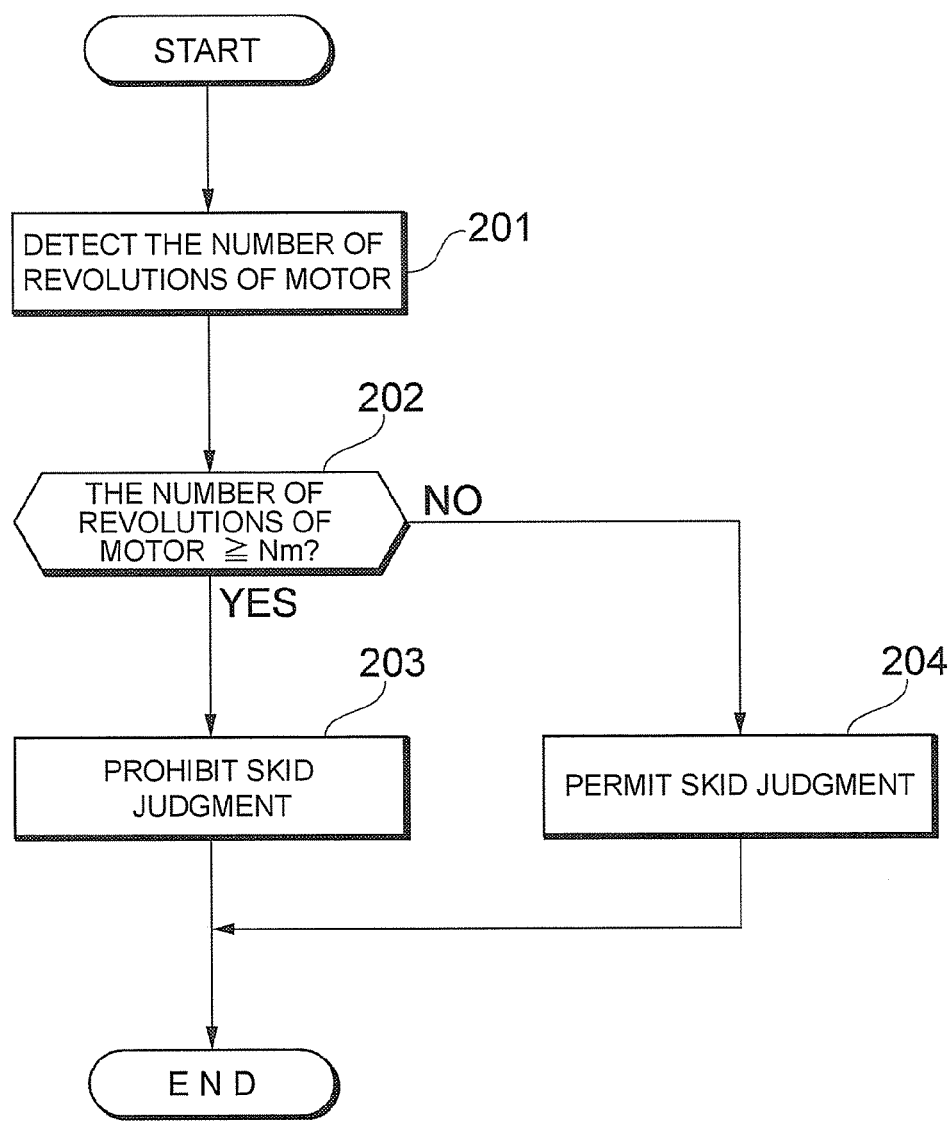
FIG. 2 is a diagram illustrating a skid judgment execution condition judgment flow according to the embodiment.

FIG. 2 illustrates a skid judgment execution condition judgment flow according to this embodiment.

The skid judgment execution condition judgment flow is repeatedly executed for a predetermined computing cycle.

The control unit 10 reads an angular velocity detection signal outputted from the angular velocity detection sensor 64 to detect the number of revolutions of the motor (Step 201). Then, the control unit 10 judges whether or not the number of revolutions of the traction motor 61 is equal to or larger than a predetermined threshold value Nm (rpm) (Step 202). Preferably, the threshold value Nm may be the smallest number of revolutions in a revolution range in which, even when the fuel cell vehicle is running while gripping a road surface, a PWM signal that controls the traction inverter 60 and a pickup cycle of the angular velocity detection sensor 64 resonate with each other, so that fluctuations in angular velocity detection signal of the angular velocity detection sensor 64 occur (a revolution range in which a skid erroneous judgment is likely to be made). When the number of revolutions of the traction motor 61 is equal to or larger than the threshold value Nm (Step 202; YES), there is a fear that the fluctuations in angular velocity detection signal occur to be erroneously judged as an indication of an increase in angular acceleration of the traction motor 61 (occurrence of skid). Therefore, the control unit 10 prohibits a skid judgment (Step 203). On the other hand, when the number of revolutions of the traction motor 61 is smaller than the predetermined threshold value Nm (Step 202; NO), the control unit 10 permits the skid judgment (Step 204).

After the skid judgment is permitted, the control unit 10 calculates an angular acceleration α of the drive shaft 65 based on the angular velocity detection signal outputted from the angular velocity detection sensor 64, and judges whether or not the angular acceleration a exceeds a predetermined threshold value αth. When the angular acceleration a exceeds the threshold value αth, the control unit 10 judges that the skid of the drive wheels 63L and 63R occurs, and restricts the drive torque of the traction motor 61 such that a skid amount of the drive wheels 63L and 63R matches a target skid amount, to thereby suppress overdischarging of the battery 20 during skid running.

As described above, when the number of revolutions of the motor is equal to or larger than the threshold value Nm, the skid judgment is prohibited, whereby it can be made possible to avoid the skid erroneous judgment in a high revolution range with the number of revolutions equal to or larger than Nm. In general, as the number of revolutions of the motor becomes larger, the motor torque becomes smaller. Accordingly, with a larger number of revolutions, an electric power error during the occurrence of a skid becomes smaller. In consideration of that fact, no practical problem occurs even when the skid judgment is prohibited in the high revolution range with the number of revolutions equal to or larger than Nm. In addition, the revolution range of the motor in which the skid erroneous judgment is made is limited to the high revolution range, and hence the skid erroneous judgment is not made in the low revolution range.

The invention claimed is:

1. A vehicle skid control device configured to control a motor transmitting power to a drive shaft connected to drive wheels of respective wheels, the vehicle skid control device comprising:
 a number-of-revolutions detection device configured to detect the number of revolutions of the motor;
 an angular acceleration detection device configured to detect an angular acceleration of the drive shaft;
 a skid judgment device configured to judge, based on the angular acceleration detected by the angular acceleration detection device, whether or not the drive wheels are skidding; and
 a skid judgment execution condition judgment device configured to permit, when the number of revolutions detected by the number-of-revolutions detection device is smaller than a predetermined threshold value, a skid judgment by the skid judgment device, and to prohibit, when the number of revolutions detected by the number-of-revolutions detection device is equal to or larger than the predetermined threshold value, the skid judgment by the skid judgment device.

2. The vehicle skid control device according to claim 1, wherein the predetermined threshold value corresponds to the smallest number of revolutions in a range of the number of revolutions of the motor at which the skid judgment device makes a skid erroneous judgment due to a detection error of the angular velocity detection device.

\* \* \* \* \*

UNITED STATES PATENT AND TRADEMARK OFFICE
CERTIFICATE OF CORRECTION

| | | |
|---|---|---|
| PATENT NO. | : 8,571,732 B2 | Page 1 of 1 |
| APPLICATION NO. | : 12/810474 | |
| DATED | : October 29, 2013 | |
| INVENTOR(S) | : M. Yoshida et al. | |

It is certified that error appears in the above-identified patent and that said Letters Patent is hereby corrected as shown below:

In the Specification

Column 5, line 3, change "acceleration a exceeds" to -- acceleration $\alpha$ exceeds --.

Column 5, line 4, change "acceleration a exceeds" to -- acceleration $\alpha$ exceeds --.

Signed and Sealed this
Fourth Day of March, 2014

Michelle K. Lee
*Deputy Director of the United States Patent and Trademark Office*